United States Patent
Terai (10) Patent No.: US 10,297,283 B2
(45) Date of Patent: May 21, 2019

(54) SELECTIVE SOUND STORAGE DEVICE

(71) Applicant: Gibson Brands, Inc., Nashville, TN (US)

(72) Inventor: Shota Terai, Tokyo (JP)

(73) Assignee: Gibson Brands, Inc., Nashville, TN (US)

( * ) Notice: Subject to any disclaimer, the term of this patent is extended or adjusted under 35 U.S.C. 154(b) by 0 days.

(21) Appl. No.: 15/110,029

(22) PCT Filed: Dec. 30, 2014

(86) PCT No.: PCT/US2014/072734
§ 371 (c)(1),
(2) Date: Jul. 6, 2016

(87) PCT Pub. No.: WO2015/103253
PCT Pub. Date: Jul. 9, 2015

(65) Prior Publication Data
US 2016/0336037 A1    Nov. 17, 2016

Related U.S. Application Data (60) Provisional application No. 61/924,044, filed on Jan. 6, 2014.

(51) Int. Cl.
*H04R 29/00* (2006.01)
*G11B 20/10* (2006.01)
(Continued)

(52) U.S. Cl.
CPC ..... *G11B 20/10527* (2013.01); *G10H 1/0033* (2013.01); *G10H 3/186* (2013.01);
(Continued)

(58) Field of Classification Search
CPC ........... G11B 2020/10564; G11B 2020/10574; G11B 2020/10555; G11B 27/22; H04M 3/42221
See application file for complete search history.

(56) References Cited

U.S. PATENT DOCUMENTS 4,829,578 A * 5/1989 Roberts .................. G10L 25/87
704/233
5,293,273 A * 3/1994 Glick ....................... G01V 1/24
360/5
(Continued)

FOREIGN PATENT DOCUMENTS

JP    2001-035136 A    9/2001
JP    2010-27115       2/2010
(Continued)

OTHER PUBLICATIONS

International Search Report and Written Opinion of the International Searching Authority; dated Mar. 13, 2015; p. 1-14; Korean Intellectual Property Office, Daejeon Metropolitan City, Republic of Korea.
(Continued)

*Primary Examiner* — Duc Nguyen
*Assistant Examiner* — Kile Blair
(74) *Attorney, Agent, or Firm* — Bates & Bates, LLC (57) ABSTRACT

A computer-readable medium, controller and a method of automatically recording a sound signal is provided. A sound signal is received by the controller from a sound generating device. A frequency of the received sound signal is determined by the controller. When the determined frequency is within a predetermined frequency range, the controller starts recording the received sound signal.

19 Claims, 7 Drawing Sheets

(51) Int. Cl.
  *G10H 1/00* (2006.01)
  *G10H 3/18* (2006.01)
  *G10L 25/78* (2013.01)
  *G10L 25/51* (2013.01)
(52) U.S. Cl.
  CPC .............. *G10H 3/188* (2013.01); *G10L 25/51* (2013.01); *G10L 25/78* (2013.01); *G10H 2210/066* (2013.01); *G10L 2025/783* (2013.01); *G11B 2020/10564* (2013.01); *G11B 2020/10574* (2013.01)

(56) References Cited

U.S. PATENT DOCUMENTS

| | | | | |
|---|---|---|---|---|
| 6,031,915 | A * | 2/2000 | Okano | G10L 15/26 381/110 |
| 8,504,358 | B2 * | 8/2013 | Kang | G11B 20/10527 381/56 |
| 2004/0071442 | A1 | 4/2004 | Wells | |
| 2005/0096764 | A1 * | 5/2005 | Weiser | G11B 27/034 700/94 |
| 2011/0137644 | A1 | 6/2011 | Nillsson et al. | |
| 2011/0208330 | A1 * | 8/2011 | Oomae | G10H 1/0033 700/94 |
| 2012/0177228 | A1 | 7/2012 | Nathan et al. | |

FOREIGN PATENT DOCUMENTS

| | | |
|---|---|---|
| JP | 2011-150060 | 8/2011 |
| KR | 10-0126617 B1 | 4/1998 |
| KR | 0126617 B1 * | 4/1998 |
| KR | 10-1998-0049884 A | 9/1998 |

OTHER PUBLICATIONS

European Search Report & Written Opinion; Sucher, Ralph; dated Jul. 13, 2017; p. 1-8; European Patent Office, Munich, Germany.

Japanese Office Action; Saito, Makoto; dated May 8, 2017; p. 1-6; Japanese Patent Office, 3-4-3 Kasumigaseki, Chiyoda-ku, Tokyo, Japan.

Chinese Office Action 100033, Chinese Patent Office dated Apr. 3, 2018.

European Search Report & Written Opinion; European Patent Office dated Mar. 8, 2018.

Japanese Office Action; Saito, Makoto; May 8, 2017; p. 1-6; Japanese Patent Office, 3-4-3 Kasumigaseki, Chiyoda-ku, Tokyo, Japan.

* cited by examiner

SELECTIVE SOUND STORAGE DEVICE

CROSS-REFERENCE TO RELATED APPLICATION

This Application claims priority to U.S. Provisional Patent Application Ser. No. 61/924,044, filed Jan. 6, 2014, and PCT/US14/72734, filed Dec. 30, 2014, which are hereby incorporated by reference in their entirety.

BACKGROUND

Sound storage devices may detect a level of a signal input from an instrument to automatically start recording when the detected level of the signal is higher than a predetermined threshold value. However, these sound storage devices cannot always start recording at an intended timing, for example, because the tones from playing instruments vary widely from player to player, and the levels of signals output from the instruments also vary widely. For example, the level of a signal of a large sound such as a note, chord, or passage played fortissimo is high, while the level of a signal of pianissimo with delicate expression is low. Therefore, if the start of the automatic recording is determined based only on the level of the signal, it is difficult for the storage device to determine the start of the automatic recording when a low-level signal based on delicate expression is input. As a result, the musical performance may not be recorded.

SUMMARY

In an example embodiment, a method of automatically recording a sound signal is provided. A sound signal is received by a controller from a sound generating device. A frequency of the received sound signal is determined by the controller. When the determined frequency is within a predetermined frequency range, the controller starts recording the received sound signal.

In another example embodiment, a computer-readable medium is provided having stored thereon computer-readable instructions that when executed by a controller, cause the controller to perform the method of automatically recording a sound signal.

In yet another example embodiment, a controller is provided. The controller includes, but is not limited to, an input interface, a processor and a computer-readable medium operably coupled to the processor. The input interface is configured to receive a sound signal from a sound generating device. The computer-readable medium has instructions stored thereon that, when executed by the processor, cause the controller to perform the method of automatically recording a sound signal.

Other principal features of the current disclosure will become apparent to those skilled in the art upon review of the following drawings, the detailed description, and the appended claims.

BRIEF DESCRIPTION OF THE DRAWINGS

Illustrative embodiments will be described referring to the accompanying drawings, wherein like numerals denote like elements.

DETAILED DESCRIPTION

Figure 1:
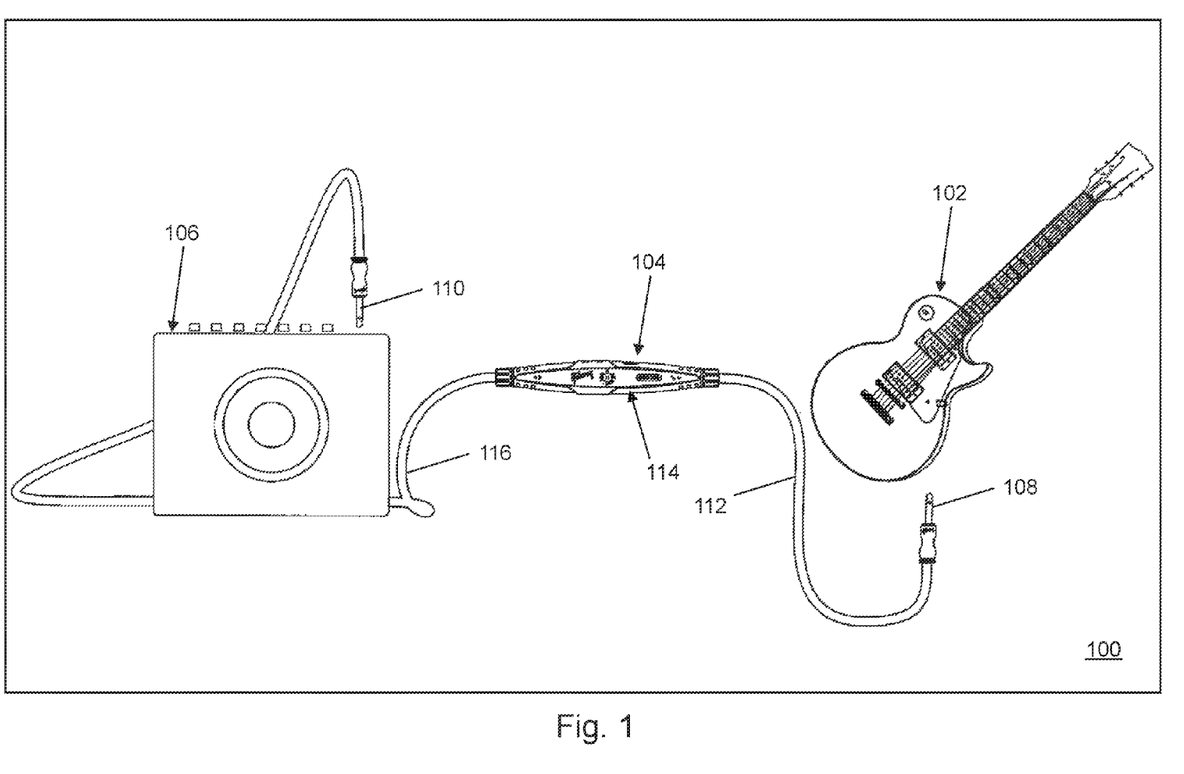
FIG. 1 depicts a system diagram of a sound system in accordance with an illustrative embodiment.

Referring to FIG. 1, a system diagram of a sound system 100 is shown in accordance with an illustrative embodiment. In an illustrative embodiment, sound system 100 may include a sound generating device 102, a controller 104, and a sound producing device 106. In the illustrative embodiment, sound generating device 102 is an electric guitar. Sound generating device 102 may include any musical instrument such as an electric guitar, a keyboard, a microphone, etc. In the illustrative embodiment, sound producing device 106 is an amplifier. Sound producing device 106 may include any type of amplifier, mixer, speaker, etc.

Controller 104 is electrically coupled between sound generating device 102 and sound producing device 106 to receive a sound signal produced by sound generating device 102 and to send the received sound signal to sound producing device 106. In the illustrative embodiment, controller 104 processes sound signals. Other types of signals, such as a video signal, may be processed in a similar manner. Controller 104 may include an input connector 108 and an output connector 110. Example input connectors include ¼" ts jacks such as male mono jacks, which may be straight or right-angled. Example output connectors include ¼" ts jacks, such as male mono jacks, which may also be straight or right-angled. The type of input connector and the type of output connector are not meant to be limiting and can be adapted for use with individual instruments and amplifiers. For example, in one embodiment, input connector 108 is a TRS connector, which is ¼", ⅛" or 3/32 inch in size. In this embodiment, the TRS connector may be mono or stereo. In another embodiment, input connector 108 is an XLR connector. In one embodiment, input connector 108 and output connector 110 are the same type of connector. In alternative embodiments, input connector 108 and output connector 110 are different types of connectors. Input connector 108 is electrically coupled to a signal output of sound generating device 102. Output connector 110 is electrically coupled to a signal input of sound producing device 106. A first length of cable 112 may extend between input connector 108 and a housing 114 of controller 104. A second length of cable 116 may extend between output connector 110 and housing 114 of controller 104.

Figure 2:
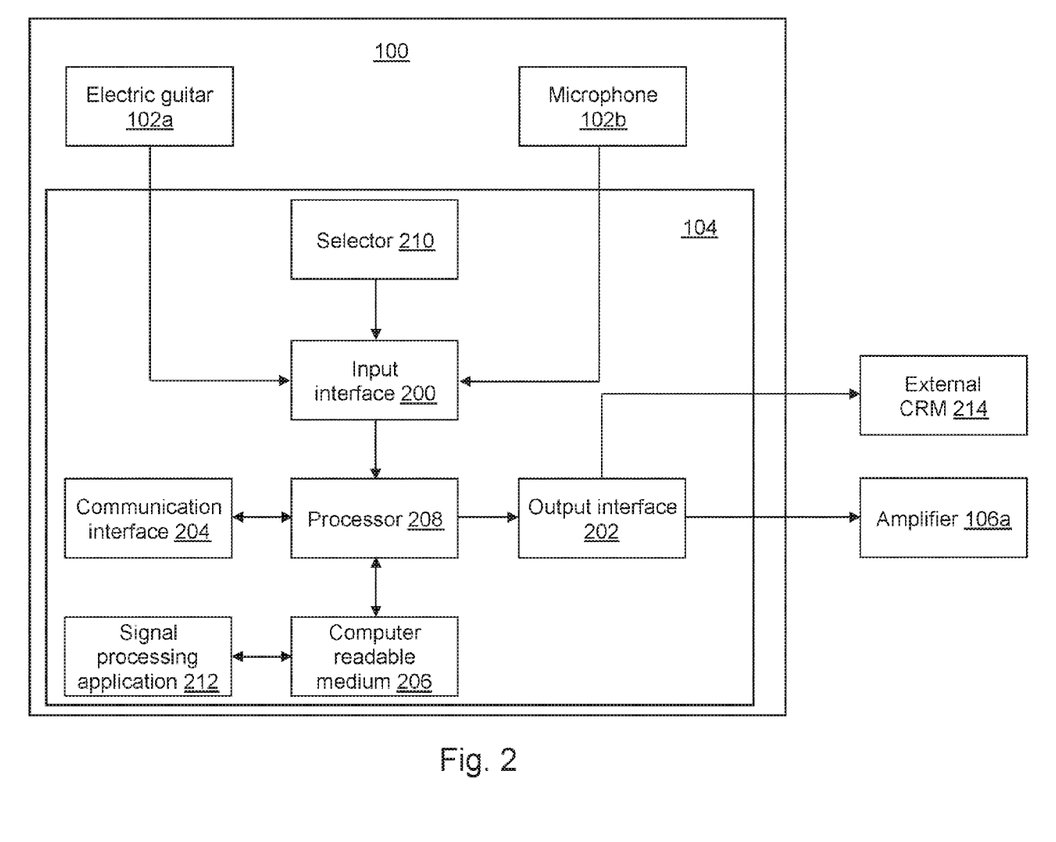
FIG. 2 depicts a block diagram of the sound system of FIG. 1 in accordance with an illustrative embodiment.

Referring to FIG. 2, a block diagram of sound system 100 is shown in accordance with an illustrative embodiment. An electric guitar 102a is a first example sound generating device 102 of sound system 100. An electrical signal based on a string vibration is detected by a pickup of electric guitar 102a and output to controller 104 through input connector 108. A microphone 102b is a second example sound generating device 102 of sound system 100. An amplifier 106a is a first example sound producing device 106 of sound system 100. Controller 104 may include an input interface 200, an output interface 202, a communication interface 204, a computer-readable medium 206, a processor 208, a selector 210, and a signal processing application 212. Fewer, different, and additional components may be incorporated into controller 104. Sound system 100 may further include an external computer-readable medium 214.

Input interface 200 provides an interface for receiving sound from sound generating device 102 as understood by those skilled in the art. Input interface 200 may further provide an interface for receiving information from the user for entry into controller 104 as understood by those skilled in the art. Controller 104 may have one or more input interfaces that use the same or a different input interface technology. Input connector 108 and first length of cable 112 are an example of input interface 200 that provides an interface for receiving sound from sound generating device 102. Selector 210 provides an example of input interface 200 that provides an interface for receiving information from the user. Selector 210 may include various input technologies including, but not limited to, a keyboard, a mouse, a touch screen display, a track ball, a keypad, one or more buttons, one or more switches, etc. to allow the user to enter information into controller 104 or to make selections presented in a user interface presented on the display. The same interface may support both input interface 200 and output interface 202. For example, a display comprising a touch screen both allows user input and presents output to the user.

Output interface 202 provides an interface for outputting a sound signal to sound producing device 102. Output interface 202 further may provide an interface for outputting a sound signal and/or other information to external computer-readable medium 214. Output interface 202 further may provide an interface for outputting information to a user of controller 104. Controller 104 may have one or more output interfaces that use the same or a different interface technology. For example, output interface 202 may interface with various output technologies including, but not limited to, the display, a speaker, amplifier 106a, etc.

Communication interface 204 provides an interface for receiving and transmitting data between devices using various protocols, transmission technologies, and media as understood by those skilled in the art. Communication interface 204 may support communication using various transmission media that may be wired and/or wireless. Controller 104 may have one or more communication interfaces that use the same or a different communication interface technology. Communication interface 204 may act as another input interface and/or output interface of controller 104. Example communication interfaces include an Ethernet connector, a universal serial bus connector (USB), a mini USB connector, a micro USB connector, a high-definition multimedia interface connector, etc.

Computer-readable medium 206 is an electronic holding place or storage for information so the information can be accessed by processor 208 as understood by those skilled in the art. Computer-readable medium 206 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Controller 104 may have one or more computer-readable media that use the same or a different memory media technology. Controller 104 also may have one or more drives that support the loading of a memory media such as a CD, DVD, flash memory device.

Based on the control by controller 104, computer-readable medium 206 is configured to store recording data generated from a signal input from sound generating device 102. Controller 104 may control the output of the recorded data stored in computer-readable medium 206 to sound producing device 106.

External computer-readable medium 214 may comprise a secure digital memory card, a hard disk, a flash memory card, a CD, a DVD, etc. Based on the control by controller 104, external computer-readable medium 214 is configured to store recording data generated from a signal input from sound generating device 102 and/or to output the recorded data stored therein to controller 104 and thereby to sound producing device 106. External computer-readable medium 214 can be removed from housing 114 of controller 104.

Processor 208 executes instructions as understood by those skilled in the art. The instructions may be carried out by a special purpose computer, logic circuits, or hardware circuits. Processor 208 may be implemented in hardware, firmware, or any combination of these methods. The term "execution" is the process of running an application or the carrying out of the operation called for by an instruction. The instructions may be written using one or more programming language, scripting language, assembly language, etc. Processor 208 executes an instruction, meaning it performs/controls the operations called for by that instruction. Processor 208 operably couples with input interface 200, with output interface 202, with communication interface 204, and with computer-readable medium 206 to receive, to send, and to process information. Processor 208 may retrieve a set of instructions from a permanent memory device and copy the instructions in an executable form to a temporary memory device that is generally some form of RAM. Controller 104 may include a plurality of processors that use the same or a different processing technology.

Signal processing application 212 performs operations associated with automatically controlling the recording of the sound signal received from sound generating device 102. Some or all of the operations described herein may be embodied in signal processing application 212. The operations may be implemented using hardware, firmware, software, or any combination of these methods. Referring to the example embodiment of FIG. 2, signal processing application 212 is implemented in software (comprised of computer-readable and/or computer-executable instructions) stored in computer-readable medium 206 and accessible by processor 208 for execution of the instructions that embody the operations of signal processing application 212. Signal processing application 212 may be written using one or more programming languages, assembly languages, scripting languages, etc.

Controller 104 may include a device that processes the input sound signal to change the tone, an amplifier simulator that simulates a guitar amplifier, etc.

Figure 3:
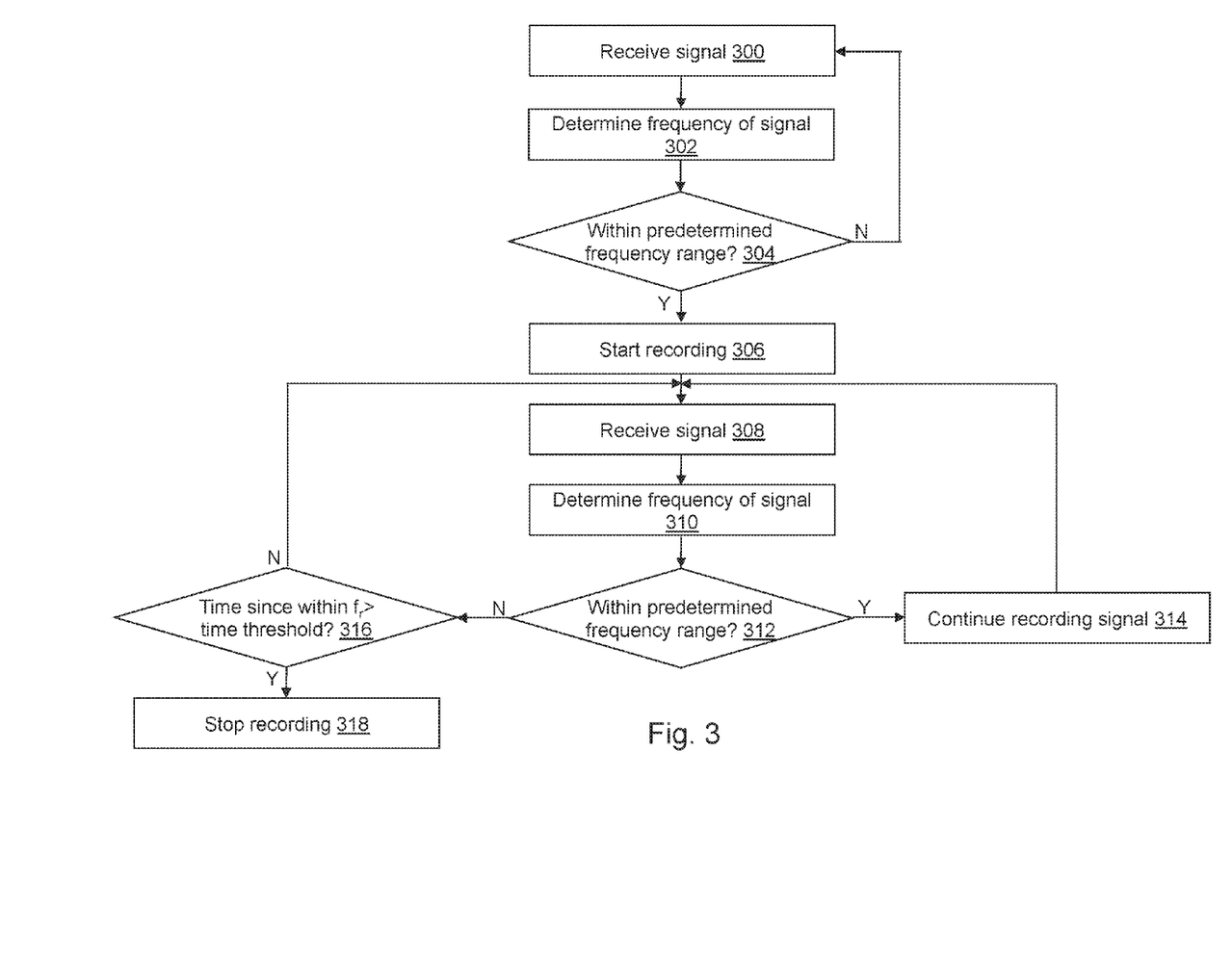
FIG. 3 depicts a flow diagram illustrating example operations performed by a sound recording device of the sound system of FIG. 1 in accordance with an illustrative embodiment.

Referring to FIG. 3, example operations associated with signal processing application 212 are described. Additional, fewer, or different operations may be performed depending on the embodiment. Although some of the operational flows are presented in sequence, the various operations may be performed in various repetitions, concurrently, and/or in other orders than those that are illustrated.

In an operation 300, a signal is received from sound generating device 102 through input interface 200 of controller 104. In an operation 302, a frequency of the received signal is determined. In an operation 304, a determination is made concerning whether or not the determined frequency is within a predetermined frequency range, that is, whether the input signal corresponds to a signal output from a sound generating device 102 such as electric guitar 102a during a musical performance. For example, a recording after electric guitar 102a is played may be desired. Electric guitars generally generate signal in the frequency range of 80-1300 hertz. The predetermined frequency range may be based on a frequency range of sound signals produced by electric guitar 102a or whatever portion of sound produced by sound system 100 is desired to be recorded. As a result, controller 104 can determine whether a musician has started playing electric guitar 102a. The predetermined frequency range may be stored in computer-readable medium 206 after input by a user, for example, through input interface 200, or after being pre-programmed with frequency values such as a minimum and a maximum frequency.

A plurality of frequency ranges corresponding to a plurality of instruments as recording targets may be stored in computer-readable medium 206. In this case, controller 104 may include selector 210 for selecting a desired frequency range according to the instrument played by the user from among the plurality of frequency ranges stored in the memory. The frequency range selected by selector 210 may be used to determine the start or stop of recording.

If the determined frequency is not within the predetermined frequency range, processing continues in operation 300 to continue to monitor the received signal. If the determined frequency is within the predetermined frequency range, processing continues in an operation 306. In operation 306, controller 104 starts recording and storing the recorded data generated from the input signal on computer-readable medium 206 and/or on external computer-readable medium 214. A variety of different formats may be used for storing the recorded data including WAV, MP3, DSD, etc. The storage format may be stored in computer-readable medium 206 after selection or input by the user, for example, through input interface 200, or after being pre-programmed with a predefined format. The signal can be a stereo signal or a monaural signal.

In an operation 308, a second signal is received from sound generating device 102 through input interface 200 of controller 104 after starting the recording. In an operation 310, a second frequency of the received second signal is determined. In an operation 312, a determination is made concerning whether or not the determined second frequency is within the predetermined frequency range. For example, controller 104 determines whether the player continues to play electric guitar 102a. If the determined second frequency is not within the predetermined frequency range, processing continues in an operation 316. If the determined second frequency is within the predetermined frequency range, processing continues in an operation 314. In operation 314, controller 104 continues recording and storing the recorded data generated from the input signal on computer-readable medium 206 and/or on external computer-readable medium 214. In operation 314, a length of time since the determined second frequency was not within the predetermined frequency range is reset to zero. Processing continues in operation 308 to continue receiving and processing the signal from sound generating device 102.

In an operation 316, a determination is made concerning whether or not the length of time since the determined second frequency was not within the predetermined frequency range has exceeded a first time threshold. In an illustrative embodiment, the first time threshold is two seconds. Of course, other lengths of time, including zero, may be used and may be selected by the user as an input using selector 210 of input interface 200. If the length of time since the determined second frequency was not within the predetermined frequency range has exceeded the first time threshold, processing continues in an operation 318. If the length of time since the determined second frequency was not within the predetermined frequency range has not exceeded the first time threshold, processing continues in operation 308 to continue receiving and processing the signal from sound generating device 102. In operation 318, the recording and storing is stopped.

In an illustrative embodiment, controller 104 records the signal received from sound generating device 102 temporarily on computer-readable medium 206. When the power of external computer-readable medium 214 is turned on, for example, when the determined frequency is within the predetermined frequency range in operation 304, controller 104 starts generating recording data from the signal input several seconds before and temporarily stored on computer-readable medium 206. As a result, controller 104 can start recording an input signal from several seconds before the timing determined in operation 304 to start the recording to store the recording data on external computer-readable medium 214 from a position of a rise of the signal to be recorded. In an illustrative embodiment, controller 104 starts storing pre-recorded data from two seconds before.

As a result of the above process, controller 104 can automatically control the recording of sound only when the frequency of the input signal is within the predetermined frequency range. Computer-readable medium 206 and/or external computer-readable medium 214 store a frequency range (equivalent to the scale) of signals that can be generated by sound generating device 102 during a musical performance. As a result, controller 104 can determine whether a signal input from sound generating device 102 is a signal to record and/or output during the musical performance. As a result, noise or the like picked up by the pickup of electric guitar 102a or by first length of cable 112 or the like can be distinguished from the signal output from electric guitar 102a during the musical performance. Recording can be started only if the input signal is output from electric guitar 102a during the musical performance. Therefore, controller 104 can start automatic recording at an appropriate time to ensure recording and stop the recording at an appropriate time such as when electric guitar 102a is not being played. To replay the sound based on the recorded data, controller 104 converts the recorded data to a signal and outputs the converted signal to sound producing device 106.

Figure 4A:
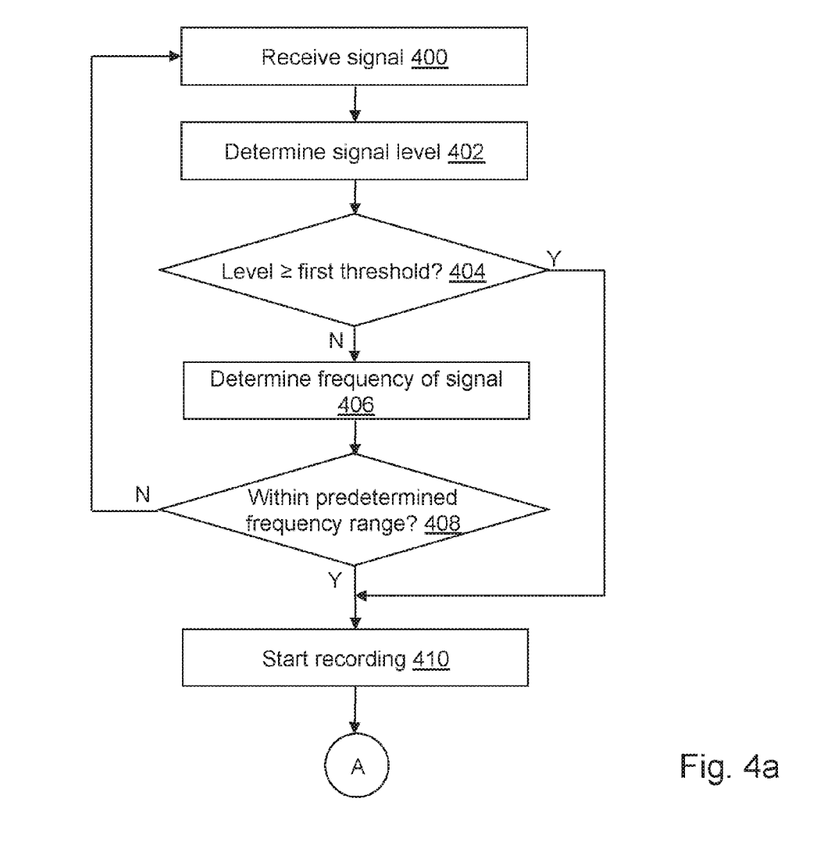
FIGS. 4a and 4b depict a flow diagram illustrating example operations performed by the sound recording device of the sound system of FIG. 1 in accordance with another illustrative embodiment.
Figure 4B:
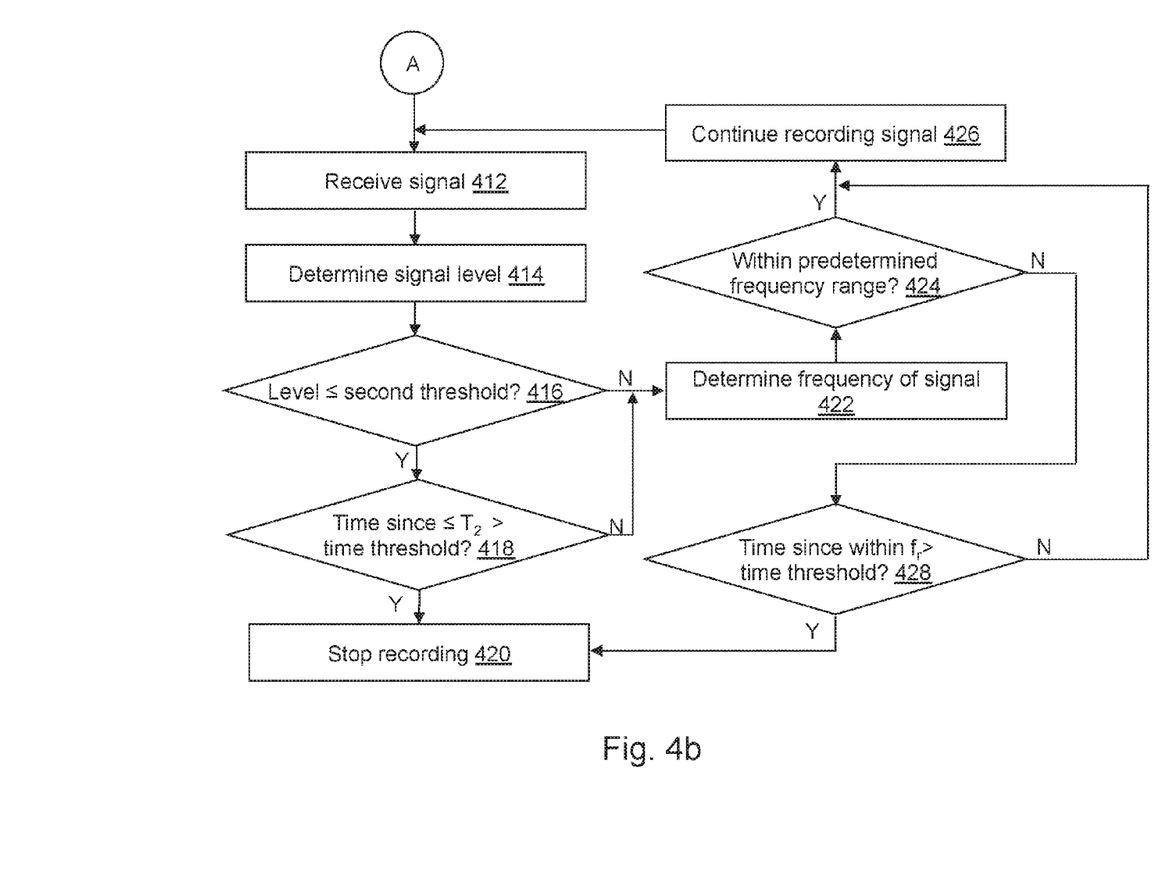

Referring to FIGS. 4a and 4b, example operations associated with signal processing application 212 are described in accordance with a second illustrative embodiment. Additional, fewer, or different operations may be performed depending on the embodiment. Although some of the operational flows are presented in sequence, the various operations may be performed in various repetitions, concurrently, and/or in other orders than those that are illustrated.

In an operation 400, a signal is received from sound generating device 102 through input interface 200 of controller 104. In an operation 402, a signal level of the received signal is determined. In an operation 404, a determination is made concerning whether or not the determined signal level is above a first predetermined threshold level. In an illustrative embodiment, the first predetermined threshold level is −24 decibels relative to full scale (dBFS). Of course, other threshold levels may be used and may be selected by the user as an input using selector 210 of input interface 200. In an illustrative embodiment, the determination may be made if the determined signal level is equal to or above the first predetermined threshold level. If the determined signal level is not above the first predetermined threshold level, processing continues in an operation 406. If the determined signal level is above the first predetermined threshold level, processing continues in an operation 410.

In an operation 406, a frequency of the received signal is determined. In an operation 408, a determination is made concerning whether or not the determined frequency is within a predetermined frequency range, that is, whether the input signal corresponds to a signal output from a sound generating device 102 such as electric guitar 102a during a musical performance. If the determined frequency is not within the predetermined frequency range, processing continues in operation 400 to continue to monitor the received signal. If the determined frequency is within the predetermined frequency range, processing continues in operation 410. In operation 410, controller 104 starts recording and storing the recorded data generated from the input signal on computer-readable medium 206 and/or on external computer-readable medium 214.

In an operation 412, a second signal is received from sound generating device 102 through input interface 200 of controller 104 after starting the recording. In an operation 414, a second signal level of the received signal is determined. In an operation 416, a determination is made concerning whether or not the determined second signal level is below a second predetermined threshold level. In an illustrative embodiment, the second predetermined threshold level is −48 dBFS. Of course, other threshold levels may be used and may be selected by the user as an input using selector 210 of input interface 200.

In an illustrative embodiment, the determination may be made if the determined second signal level is equal to or below the second predetermined threshold level. In an illustrative embodiment, the second predetermined threshold level is lower than the first predetermined threshold level. If the determined second signal level is not below the second predetermined threshold level, processing continues in an operation 422. If the determined second signal level is below the second predetermined threshold level, processing continues in an operation 418.

In an operation 418, a determination is made concerning whether or not a length of time since the second signal level was below the second predetermined threshold level has exceeded a second time threshold. In an illustrative embodiment, the second time threshold is two seconds. Of course, other lengths of time, including zero, may be used and may be selected by the user as an input using selector 210 of input interface 200. If the length of time since the determined second signal level was below the second predetermined threshold level has exceeded the second time threshold, processing continues in an operation 420. If the length of time since the determined second signal level was below the second predetermined threshold level has not exceeded the second time threshold, processing continues in an operation 422. In operation 420, the recording and storing is stopped.

In operation 422, a second frequency of the received second signal is determined. In operation 422, the length of time since the second signal level was below the second predetermined threshold level is reset to zero.

In an operation 424, a determination is made concerning whether or not the determined second frequency is within the predetermined frequency range. If the determined second frequency is not within the predetermined frequency range, processing continues in an operation 428. If the determined frequency is within the predetermined frequency range, processing continues in an operation 426. In operation 426, controller 104 continues recording and storing the recorded data generated from the input signal on computer-readable medium 206 and/or on external computer-readable medium 214. In operation 426, the length of time since the determined second frequency was not within the predetermined frequency range and the length of time since the second signal level was below the second predetermined threshold level are reset to zero. Processing continues in operation 412 to continue receiving and processing the signal from sound generating device 102.

In an operation 428, a determination is made concerning whether or not a length of time since the determined second frequency was not within the predetermined frequency range has exceeded the first time threshold. If the length of time since the determined second frequency was not within the predetermined frequency range has exceeded the first time threshold, processing continues in operation 420. If the length of time since the determined second frequency was not within the predetermined frequency range has not exceeded the first time threshold, processing continues in operation 426 to continue recording and storing the recorded data generated from the input signal on computer-readable medium 206 and/or on external computer-readable medium 214. The first time threshold and the second time threshold may have the same or different values.

As a result of the above process, controller 104 considers only the level of the signal to start the automatic recording if a large input signal is detected. If a small input signal is detected, controller 104 automatically performs recording only if the frequency of the input signal is within the predetermined frequency range. As a result, controller 104 takes only the level of the signal into account to start the automatic recording if the player is clearly playing the instrument. During a delicate musical performance of pianissimo by the player or if whether the player is playing the instrument cannot be determined, controller 104 determines whether the frequency of the input signal is within the predetermined frequency range. Controller 104 stops recording if the level of the signal input during the recording is equal to or smaller than the second threshold value so the recording can be stopped if the level of the input signal is at a level that is imperceptible or nearly imperceptible by human ears. The second predetermined threshold level is set at a level lower than the first predetermined threshold level so that, when the volume is gradually reduced to end the musical performance, a sudden stop of recording before the volume is completely reduced can be avoided.

The process regarding the level of the signal and the process regarding the frequency of the signal may be executed in reverse order.

Figure 5:
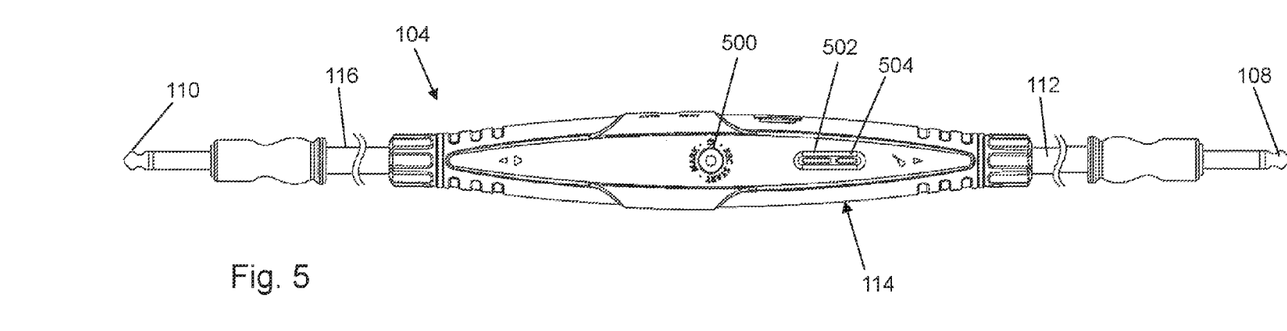
FIG. 5 depicts a first side view of the sound recording device in accordance with an illustrative embodiment.

Referring to FIG. 5, a side view of controller 104 is shown in accordance with an illustrative embodiment. Controller 104 may include a first selector 500, a first output interface 502, and a second output interface 504. First selector 500, first output interface 502, and second output interface 504 are mounted to housing 114. First selector 500 is an illustrative example of selector 210 that allows the user to turn on and off controller 104. First output interface 502 and second output interface 504 are examples of output interface 202 that interface with external computer-readable medium 214.

Figure 6:
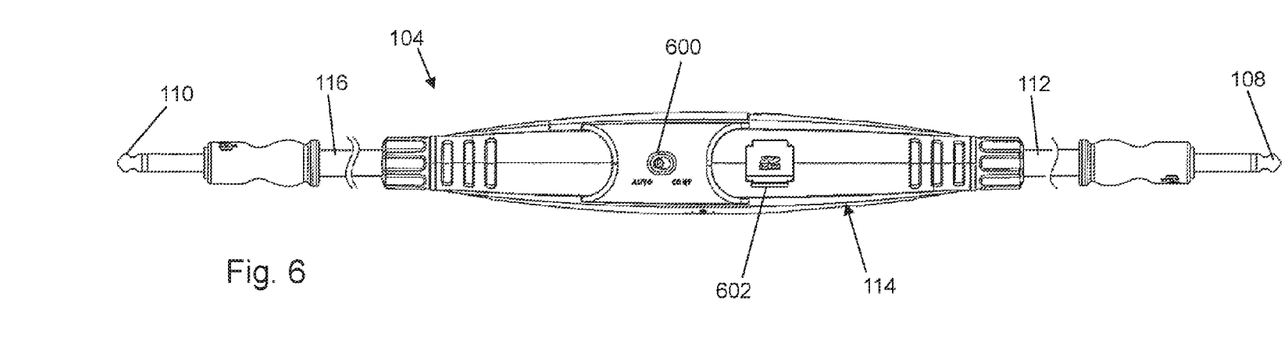
FIG. 6 depicts a second side view of the sound recording device in accordance with an illustrative embodiment.

Referring to FIG. 6, a second side view of controller 104 is shown in accordance with an illustrative embodiment. Controller 104 may include a second selector 600 and a third output interface 602 mounted to housing 114. Second selector 600 is another illustrative example of selector 210 that allows the user to switch between use of the operations of FIG. 3 and/or FIG. 4 and a continuous recording without application of the operations of FIG. 3 or FIG. 4. Third output interface 602 is another example of output interface 202 that interfaces with external computer-readable medium 214. For example, third output interface 602 may comprise an SD card slot into which an SD card is inserted.

Figure 7:
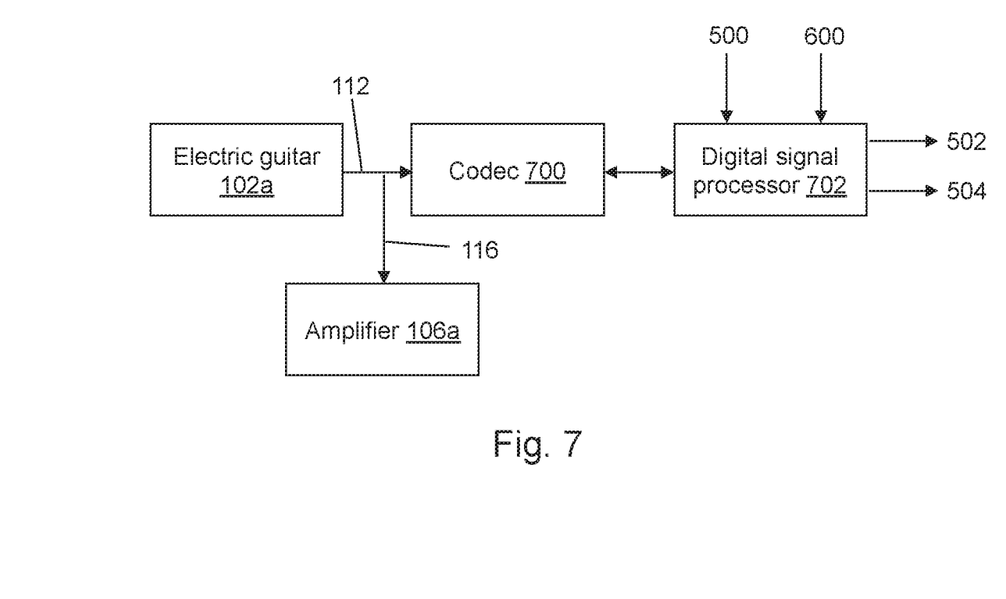
FIG. 7 depicts a connectivity diagram of the sound system of FIG. 1 in accordance with an illustrative embodiment.

Referring to FIG. 7, a connectivity diagram of sound system 100 is shown in accordance with an illustrative embodiment. First length of cable 112 interfaces with a codec 700 to receive the signal, for example, from electric guitar 102a. Second length of cable 116 interfaces with first length of cable 112 to receive the signal and to send the signal, for example, to amplifier 106a regardless of the operation of controller 104. Codec 700 is electrically coupled to send the received signal to a digital signal processor 702. Codec 700 converts the received signal to a digital signal and encodes the signal for storage. Codec 700 may also decode the recorded signal for playback. In an illustrative embodiment, codec 700 is a CS42L52 manufactured by Cirrus Logic Inc. In an illustrative embodiment, when controller 104 is off, the received signal from sound generating device 102 is sent directly to sound producing device 106 though the first length of cable 112 and the second length of cable 116.

First selector 500, second selector 600, first output interface 502, second output interface 504, and third output interface 602 are electrically coupled to digital signal processor 702. In an illustrative embodiment, digital signal processor 702 includes computer-readable medium 206 and processor 208 and signal processing application 212 stored on computer-readable medium 206. In an illustrative embodiment, digital signal processor 702 is an ADSP BF514 manufactured by Analog Devices Inc.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated. It is intended that the scope of the disclosed subject matter be defined by the claims appended hereto and their equivalents.

What is claimed is:

1. A non-transitory computer-readable storage medium having stored thereon computer-readable instructions that when executed by a controller cause the controller to perform acts comprising:
   receive a sound signal from a sound generating device; and
   determine a level of the received sound signal, and when the determined level is below a predetermined threshold:
      determine a frequency of the received sound signal; and
      when the determined frequency is within a predetermined frequency range, start recording the received sound signal.

2. The non-transitory computer-readable storage medium of claim 1, wherein the computer-readable instructions further cause the controller to perform acts comprising:
   receive a second sound signal after recording the received sound signal;
   determine a second level of the received second sound signal; and
   stop recording when:
      the determined second level is below a second predetermined threshold; and
      a predetermined time threshold is exceeded since the determined second level is below the second predetermined threshold.

3. The non-transitory computer-readable storage medium of claim 2, wherein the second predetermined threshold is less than the predetermined threshold.

4. The non-transitory computer-readable storage medium of claim 1, wherein the computer-readable instructions further cause the controller to perform acts comprising:
   receive a second sound signal after recording the received sound signal;
   and after determining a second level of the received second sound signal is above a second predetermined threshold:
      determine a second frequency of the received second sound signal; and
      continue recording when the determined second frequency is not within the predetermined frequency range.

5. The non-transitory computer-readable storage medium of claim 1, wherein the computer-readable instructions further cause the controller to perform acts comprising:
   receive a second sound signal after recording the received sound signal;
   determine a level of the received second sound signal is above a second predetermined threshold;
   determine a second frequency of the received second sound signal; and
   stop recording the received second sound signal when:
      the determined second frequency is not within the predetermined frequency range; and
      a predetermined time threshold has been exceeded since the determined second frequency has not been with the predetermined frequency range.

6. The non-transitory computer-readable storage medium of claim 1, wherein the computer-readable instructions further cause the controller to:
   receive a sound signal from a sound generating device comprising a musical instrument.

7. A controller comprising:
   an input interface configured to receive a sound signal from a sound generating device;
   a processor; and
   a computer-readable storage medium operably coupled to the processor, the computer-readable storage medium having computer-readable instructions stored thereon that, when executed by the processor, cause the controller to perform acts comprising:

determine a level of the received sound signal, and when the determined level is below a predetermined threshold:
  determine a frequency of the received sound signal; and
  when the determined frequency is within a predetermined frequency range, start recording the received sound signal.

8. The controller of claim 7, wherein the computer-readable instructions further cause the controller to perform acts comprising:
  receive a second sound signal after recording the received sound signal;
  determine a second level of the received second sound signal; and
  stop recording when:
    the determined second level is below a second predetermined threshold; and
    a predetermined time threshold is exceeded since the determined second level is below the second predetermined threshold.

9. The controller of claim 7, wherein the computer-readable instructions further cause the controller to perform acts comprising:
  receive a second sound signal after recording the received sound signal;
  and after determining a second level of the received second sound signal is above a second predetermined threshold:
    determine a second frequency of the received second sound signal; and
    continue recording when the determined second frequency is not within the predetermined frequency range.

10. The controller of claim 7, wherein the computer-readable instructions further cause the controller to perform acts comprising:
  receive a second sound signal after recording the received sound signal;
  determine a level of the received second sound signal is above a second predetermined threshold;
  determine a second frequency of the received second sound signal; and
  stop recording the received second sound signal when:
    the determined second frequency is not within the predetermined frequency range; and
    a predetermined time threshold has been exceeded since the determined second frequency has not been with the predetermined frequency range.

11. The controller of claim 7, further comprising an output interface configured to send the received sound signal to a sound producing device.

12. The controller of claim 7, further comprising an output interface, configured to output the received sound signal for recording on an external computer-readable storage medium.

13. The controller of claim 12, wherein the received sound signal recorded on the external computer-readable storage medium was recorded on the computer-readable medium before the frequency was determined to be within the predetermined frequency range.

14. The controller of claim 7, further comprising a codec electrically coupled between the input interface and the processor, wherein the codec is configured to convert the received sound signal from an analog signal to a digital signal, wherein the recorded sound signal is the digital signal.

15. The controller of claim 7, wherein the sound generating device is a musical instrument.

16. The controller of claim 7, further comprising a selector configured to allow a user to select one or more desired frequency ranges associated with one or more corresponding instruments being played by the user.

17. A method of automatically recording a sound signal, the method comprising:
  receiving, by a controller, a sound signal from a sound generating device;
  determining, by the controller, a level of the received sound signal, and when the determined level is below a predetermined threshold:
    determining, by the controller, a frequency of the received sound signal; and
    when the determined frequency is within a predetermined frequency range, starting recording, under control of the controller, the received sound signal.

18. The method of automatically recording a sound signal of claim 17, wherein the sound generating device is a musical instrument.

19. The method of automatically recording a sound signal of claim 17, further comprising receiving via a selector the predetermined frequency range selected by a user.

* * * * *